(Model.)
J. FREY.
HARROW.
No. 264,872. Patented Sept. 26, 1882.
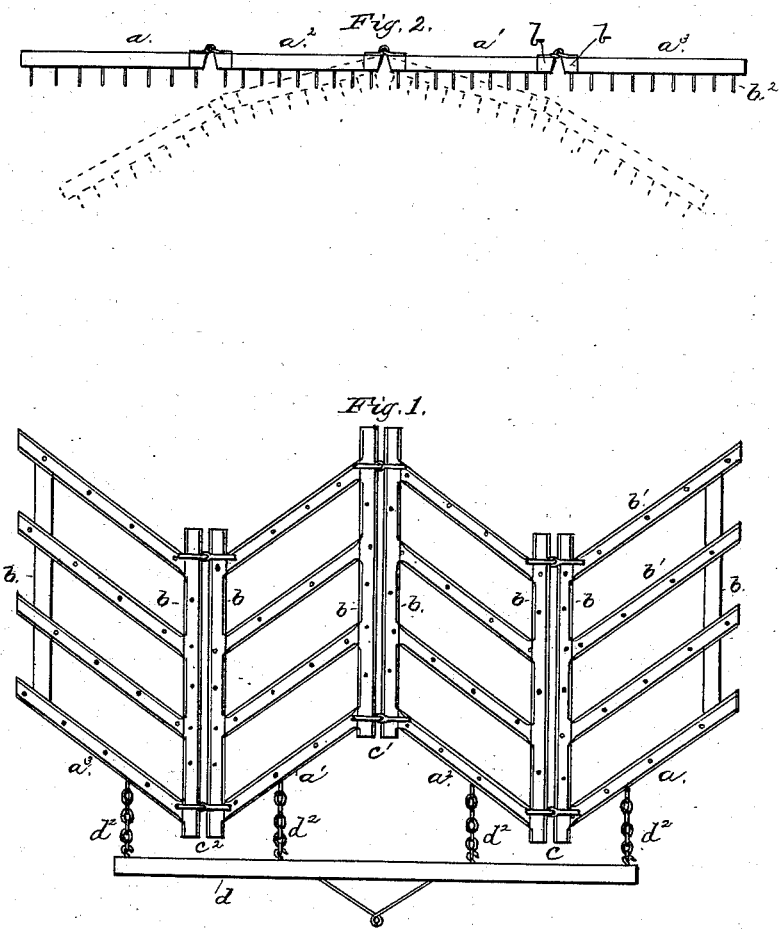

UNITED STATES PATENT OFFICE.

JOHN FREY, OF BIG RIVER, WISCONSIN.

HARROW.

SPECIFICATION forming part of Letters Patent No. 264,872, dated September 26, 1882.

Application filed June 30, 1882. (Model.)

*To all whom it may concern:*

Be it known that I, JOHN FREY, a citizen of the United States, residing at Big River, in the county of Pierce and State of Wisconsin, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in sectional drag-harrows.

It consists essentially in constructing the harrow of rhomboidal sections having their adjacent side bars beveled downward and away from each other, and having each section made inversely to its adjacent section and the alternate sections made similar to each other, and all hinged together, as will be hereinafter fully described.

In the drawings, Figure 1 is a plan view, Fig. 2 is a rear view, and Fig. 3 is a rear view showing the sections folded one upon the other.

$a$ $a'$ $a^2$ $a^3$ are the sections. They are composed of the side bars, $b$, and the cross-bars $b'$. The outer bars of the sections $a$ $a^3$ are arranged a slight distance back from the ends of the cross-bars, as shown. The side bars, it will be seen, are all parallel to each other and to the line of draft. The cross-bars $b'$, to which I secure the teeth $b^2$, extend from one to the other of the side bars, $b$, at an angle thereto and to the line of draft, forming each section a parallelogram. The adjacent edges of the inner side bars are beveled downward and away from each other, and when the sections are hinged together, as will be described, the upper side of these bars are brought close together, and the bevel on them permits the harrow to bend freely, as indicated in dotted lines, Fig. 2. The sections are hinged one to the other, forming the joints $c$ $c'$ $c^2$, and the section $a$ is similar to the section $a'$, and the section $a^2$ is similar to the section $a^3$, as shown. The cross-bars of sections $a$ $a'$ are inclined in opposite directions relatively to those of the sections $a^2$ $a^3$, and the said sections being hinged, as shown, when the sections $a$ $a^3$ are turned over on sections $a^2$ $a'$ the cross-bars of the sections $a$ $a^3$ will lie in line with and directly over the cross-bars of sections $a^2$ $a'$, and the weight of the bars of the folded sections is distributed equally and directly on the tooth-carrying bars of the under sections. The outer side bars of the sections $a$ $a^3$ being lapped, as shown in Fig. 3, the harrow is flexible at its central joint, $c'$, so as to readily cross a hillock or bend down in a slight depression in the ground, as may be necessary.

It will be seen that by the construction described I provide a harrow of a W shape, with the space between the joints $c$ $c^2$ inclined back to the joint $c'$ and the space beyond the said joints inclined backward to the outer edges of the harrow, so that all trash gathered before the harrow between the joints $c$ $c^2$ will fall back to the joint $c'$, where the flexibility of the harrow will permit it to rise over the trash, and all trash caught before the sections $a$ $a^3$ will pass off at the outer edges of the same as the harrow is dragged forward.

$d$ is the draft-bar, provided at its front side with a loop, to which the whiffletree may be connected, and it is connected to each of the sections by chains $d^2$, carried back and secured to eyes extended from said sections.

Having thus described my invention, what I claim, and desire to secure by Letters Patent, is—

A harrow composed of the rhomboidal sections $a$ $a'$ $a^2$ $a^3$, having their adjacent side bars beveled downward and away from each other, and having each section made inversely to its adjacent section and the alternate sections made similar to each other, and all hinged together, substantially as set forth.

In testimony whereof I affix my signature in presence of two witnesses.

JOHN FREY.

Witnesses:
 PETER MICHELS,
 WM. NICHOLS MICHELS.